Feb. 22, 1966  G. H. ARRASMITH  3,235,952
METHOD OF FABRICATING AND ASSEMBLING RAILROAD BRAKE SHOES
Original Filed Oct. 18, 1962  2 Sheets-Sheet 1
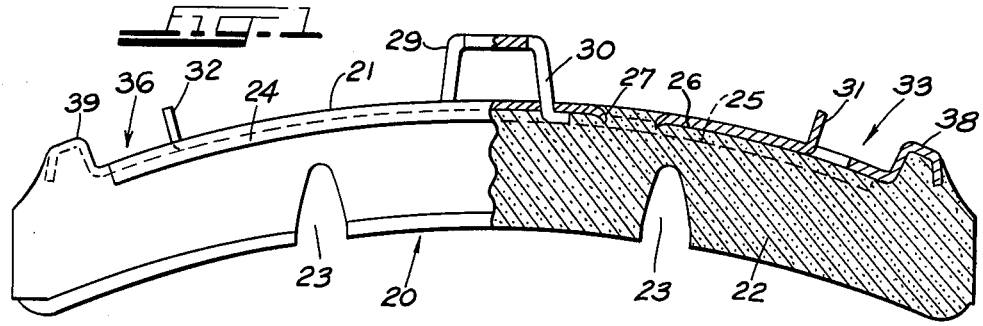
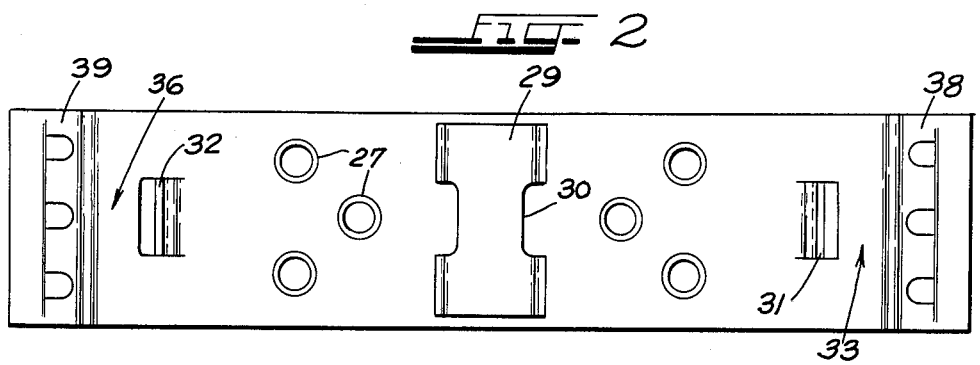
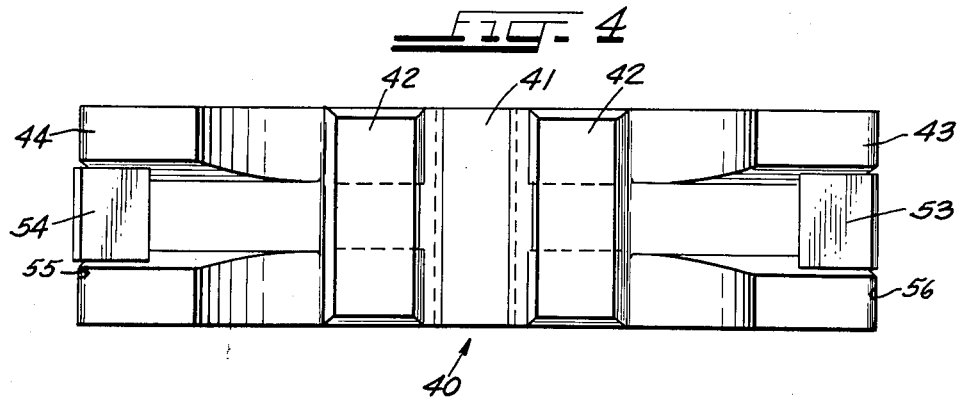
INVENTOR.
GRANT H. ARRASMITH
BY
Wallace, Kinzer and Dorn
ATTYS.

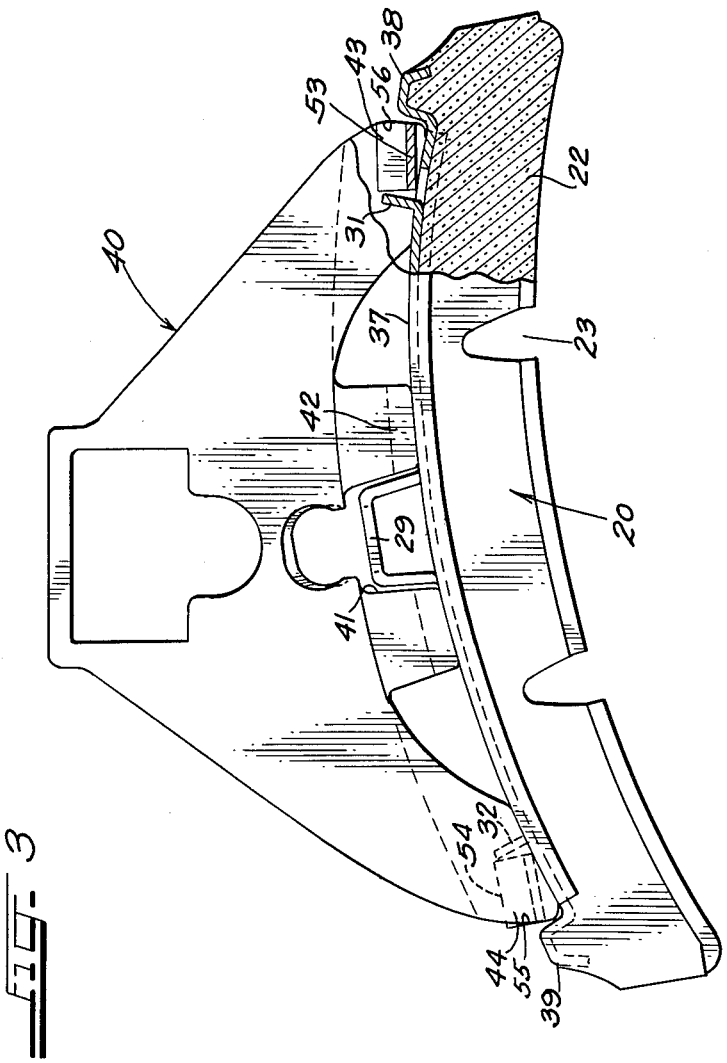

United States Patent Office 3,235,952
Patented Feb. 22, 1966

3,235,952
METHOD OF FABRICATING AND ASSEMBLING RAILROAD BRAKE SHOES
Grant H. Arrasmith, Pearl River, N.Y., assignor to American Brake Shoe Company, New York, N.Y., a corporation of Delaware
Continuation of application Ser. No. 231,470, Oct. 18, 1962. This application Sept. 22, 1964, Ser. No. 398,244
3 Claims. (Cl. 29—407)

This invention relates to a method of making a new and improved brake assembly for use in railroad braking system which utilizes composition type brake shoes instead of standard cast metal brake shoes, and is particularly concerned with a brake assembly which prevents substitution of standard cast metal shoes in the system.

This application is a continuation of application Serial No. 231,470, filed October 18, 1962, now abandoned.

The brake shoe which has long been standard in the railroad industry comprises a cast metal body of substantial thickness, having a curved braking surface corresponding, in general, to the curvature of a railroad car or locomotive wheel. The dimensions and configurations of these cast metal shoes have long been standarized in the railroad industry. The brake shoe includes a pair of end stops located at opposite ends of the convex back of the shoe and a pair of toe guides extending from the end stops toward the center portion of the shoe. An attaching lug is positioned in the center portion of the brake shoe back. The brake shoe is supported upon a brake head which includes an attaching lug recess into which the center attaching lug of the brake shoe is fitted. A portion of the brake head engages the convex surface of the brake shoe, and the extremities or toes of the brake head form a pair of recesses which receive the brake shoe toe guides.

It has been proposed that composition brake shoes be substituted for cast metal shoes in at least some railroad applications. These composition shoes, which include a composition brake body and a metal back or support structure, provide a substantially higher retarding force per unit applied load than the standard cast metal shoes in the present state of the art, except under static or load speed conditions. In general, at higher speeds, it may be stated that cast metal shoes are high-pressure low-friction devices, whereas composition shoes are high-friction, low-pressure devices. Accordingly, it is usually desirable to incorporate substantially smaller brake cylinders in a system adapted for use with composition shoes, due to the lower shoe pressure requirements. Substitution of cast metal brake shoes in a system constructed for use with composition shoes, therefore, may lead to inadequate braking and consequent danger to the railroad equipment, passengers, freight, and other property. Substitution of composition shoes in a brake system constructed for use with cast metal shoes, on the other hand, can cause substantial damage by excessively rapid braking.

It is an object of the invention, therefore, to prevent substitution of cast metal brake shoes in a railroad braking system adapted for use of composition brake shoes by resort to a particular brake assembly which will accept the composition shoe and refuse the standard cast metal shoe.

A further object of the invention is a method of making a new and improved brake head essentially that is similar to the long proven and reliable brake heads now in use on railroad equipment, but which will accept only a specific type of brake shoe structure different from the standard shoe structure. It is an important object of the invention to provide a new and improved selective brake head, adapted for use with composition brake shoes but not capable of accepting cast metal shoes, which may be conveniently and economically fabricated by modification of only one minor element of a standard brake head. An additional object of the invention is to provide a new and improved brake assembly specifically adapted for use of composition type brake shoes which is economical and convenient to manufacture and can be fabricated with the same molds used for standard brake heads with only insignificant changes.

Accordingly, the invention is directed to a method of making a selective brake assembly for preventing substitution of standard cast metal brake shoes in a railroad braking system adapted for use of composition type brake shoes and in which cast metal shoes may produce inadequate braking. The brake assembly comprises a brake shoe including a metal support member of substantially arcuate configuration and a brake shoe body of molded composition material supported upon the concave surface of that support member. A brake shoe attaching lug is affixed to the support member and extends above the central portion of the convex surface thereof; end stops are provided at the ends of the shoe. A toe guide is fabricated on one end of the metal support member and extends above the convex surface thereof. Unlike standard construction, the toe guide is not joined to the end stop of the shoe. Rather, the toe guide is spaced from the end stop to define a brake head tie bar receptacle. The brake assembly further includes a brake head having a recess for receiving the brake shoe attaching lug and a face plate for engaging the convex surface of the brake shoe support member. A tie bar is affixed to one end of the brake head; this tie bar is adapted to engage in the receptacle formed between the toe guide and end stop of the brake shoe but is positioned to interfere with the toe guide on a standard cast metal brake shoe, thereby preventing mounting of a cast metal shoe in the brake head.

Other and further objects of the present invention will be apparent from the following description and claims and are illustrated in the accompanying drawings which, by way of illustration, show a preferred embodiment of the present invention and the principle thereof and what we consider now to be the best mode in which we have contemplated applying that principle. Other embodiments of the invention embodying the same or equivalent principle may be used and structural changes may be made as desired by those skilled in the art without departing from the present invention and the purview of the appended claims.

In the drawings:

FIG. 1 is an elevation view, partly in section, of a composition type brake shoe constructed in accordance with the inventive concept;

FIG. 2 is a plan view of the brake shoe of FIG. 1;

FIG. 3 is an elevation view of a brake head constructed in accordance with the inventive concept and shows a portion of the brake shoe of FIG. 1 as supported on the brake head; and FIG. 4 is a bottom view of the brake head of FIG. 3.

The composition brake shoe 20 illustrated in FIG. 1 comprises a metal support member 21 upon which is supported a composition brake shoe body 22. Support member 21 is preferably formed from either hot-rolled or cold-rolled steel, hot-rolled steel usually being preferred. Composition body 22 may be cast or molded from any composition material suitable for railroad braking service, depending upon the type car or locomotive to which the brake shoe is to be applied. One suitable composition material, which exhibits superior characteristics with respect to heat and shock resistance and which affords a favorable ratio of wet to dry coefficients of friction, is described and claimed in Patent No. 2,901,456 of R. E. Spokes et al., issued August 25, 1959, and assigned to the same assignee as the present invention. This composition comprises a comminuted friction material, selected from the sillimanite group and related aluminum silicates, distributed in a heat-stable rubber binder; additional friction material in the form of cast iron particles may also be included.

Composition body 22 may be provided with two or more slots 23 in the braking surface thereof. The composition body is effectively bonded between a pair of longitudinal flanges 24 and 25 formed as an integral part of support member 21. In addition, the composition body and support member may be interlocked with each other by means of a plurality of individual metal projections 27 formed integrally with and extending from the lower or concave surface 26 of support member 21 into composition body 22. These individual metal anchor elements may be conveniently formed by a plurality of countersunk punched sections 27 in support member 21. In addition, the brake shoe may be provided with a separate metal reinforcing member (not shown) in accordance with the construction disclosed in Patent No. 2,885,037 of Rosser L. Wilson.

A center attaching lug 29 is clenched or otherwise affixed to support member 21 and extends above the central portion of the convex surface thereof; as indicated in FIG. 2, attaching lug 29 is provided with a keyway 30 which is utilized in mounting the brake shoe upon a brake head.

A pair of end stops 38 and 39 are formed at the opposite ends of brake shoe 20. Preferably, the end stops are afforded by bending the end portions of support member 21 upwardly, laterally and downwardly to afford reinforcement throughout the exposed surfaces of the end stops. In addition, at the end of the brake shoe adjacent end stop 38, a portion of support member 21 is punched out and bent upwardly to afford a toe guide member 31. At the opposite end of the brake shoe, a similar portion of the metal back is bent upwardly to afford a second toe guide 32.

Unlike standard cast metal brake shoe construction, toe guide 31 is not contiguous to and is not joined to the end stop 38 at the same end of the brake shoe. Instead, the toe guide is spaced from end stop 38 by a substantial distance to afford a brake head tie bar receptacle 33 which is essential to the invention, as will be explained in detail hereinafter in connection with FIGS. 3 and 4. Similarly, toe guide 32 is spaced from the adjacent end stop 39, affording a second brake head tie bar receptacle 36 which is preferably essentially similar in dimensions to the receptacle 33. It is important that the toe guide members 31 and 32 be disposed in interfering alignment with the tie bar at the end of a conventional brake head used for cast metal shoes so that the toe guides 31 and 32 effectively prevent mounting of brake shoe 20 upon a standard brake head. In this manner, brake shoe 20 is protected against incorporation in a braking system adapted for use with cast metal brake shoes.

In FIG. 3, the brake shoe 20 of FIGS. 1 and 2 is shown mounted on a brake head 40. In most respects, brake head 40 is essentially similar to the standard brake head construction employed for cast metal shoes and shown in AAR Standard drawing E–86A–1950; consequently, its individual elements are not described in detail except as they relate the modifications effected in accordance with the inventive concept. Brake head 40 has a recess 41, which receives brake shoe attaching lug 29 in the usual manner. The brake head further includes a face plate 42 which engages convex surface 37 of the brake shoe support member. As in the conventional brake head and brake shoe assembly, the extremities 43 and 44 of the brake head 40 engage the end stops 38 and 39, respectively, of the brake shoe to prevent longitudinal movement of the brake shoe with respect to the brake head when the brakes are applied.

As thus far described, brake head 40 is entirely conventional and, in accordance with one feature of the inventive concept, preferably has the same basic dimensions and configuration as a standard brake head employed in conjunction with conventional cast metal brake shoes.

Brake head 40, however, further includes a pair of tie bars 53 and 54 located at the opposite ends 43 and 44, respectively, of the brake head. A standard brake head would also include tie bars near the ends of the head, as shown in the aforementioned AAR drawing. Tie bars 53 and 54, however, are located much closer to the end surfaces 55 and 56 of brake head 40 than would be the case with a standard brake head construction. In fact, tie bars 53 and 54 must be located near enough to the ends 43 and 44 of the brake head to interfere with the conventional toe guides on a cast metal shoe. Thus, it is these elements on the brake head that prevent the mounting of a cast metal shoe thereon.

Further, tie bar 53 must be located in position to be received within the receptacle 33 afforded between toe guide 31 and end stop 38 on brake shoe 20, as clearly shown in FIG. 3. The inner surface of the tie bar faces toe guide 31 and the outer surface faces end stop 38. Thus, tie bar 53 affords a firm guiding and mounting engagement with the end portion of brake shoe 20 in a manner essentially similar to that afforded in a conventional brake head. A corresponding mounting of the brake shoe on the brake head is achieved at the opposite end of the shoe by means of the second tie bar 54.

As in a conventional brake assembly, brake head 40 is locked to brake shoe 20 by means of a key (not shown) which engages a keyway 46 in the brake head structure and which passes through the corresponding keyway 30 in the center attaching lug 29 of brake shoe 20. Thus, the mounting arrangement for brake shoe 20 on brake head 40 is essentially similar to that used conventionally, retaining all of the advantages of the proven and reliable standard construction, yet at the same time preventing interchange of composition and cast iron shoes.

Fabrication of brake shoe 20 in accordance with the method of the present invention does not add in any way to the cost of the shoes. Thus, the punching operation required to form toe guides 31 and 32 is no more complex or expensive than would be necessary to afford conventional toe guides on the brake shoes. Except for the change in the toe guide construction, the basic construction of the composition shoe remains unchanged. Of course, the toe guides are not restricted to the precise construction illustrated. For example, the toe guides could be of block-like configuration and could comprise separate elements welded or otherwise secured to the metal back.

Brake head 40, on the other hand, can be cast in the same molds as are used for standard brake heads intended for cast metal braking systems, except for the change in location of tie bars 53 and 54 as compared with standard tie bars. Indeed, brake head 40 can be fabricated by taking a standard brake head and cutting away the tie bar at each end. The tie bar can then be positioned outwardly of its normal location, in the position shown in FIGS. 3 and 4, and welded in place. This relatively simple and economical operation affords a complete brake head 40 meeting the requirements of the present invention.

Hence, while preferred embodiments of the invention have been described and illustrated, it is to be understood that they are capable of variation and modification.

I claim:

1. In the manufacture of components for a specialized railroad braking system comprising a plurality of composition-type brake shoes that can cause excessive wear and damage when incorporated in a standard system constructed for utilization of standard cast metal brake shoes, in which specialized braking system cast metal shoes provide inadequate braking, the method of fabricating component parts for said specialized system to prevent substitution of standard cast metal shoes therein and to prevent incorporation of said composition-type shoes in a standard system comprising: affixing a center mounting lug to each of the composition-type shoes intended for use in said specialized braking system, said center mounting lug substantially corresponding to the center lug on a standard cast metal shoe, forming end stops at each end of each of the composition-type shoes, said end stops each extending across the end of the shoe and projecting above the back of the shoe, forming an upwardly extending toe guide near each end of each of the composition-type shoes, forming a pair of brake head tie bar receptacles each extending above the back of the shoe and in parallel relation to the end stop at the corresponding end of the shoe and between the end stops and the toe guides, said toe guides being positioned for interfering engagement with the tie bar of a standard brake head for a cast metal shoe, whereby the composition type shoes cannot be mounted on a standard brake head, forming a center lug receptacle in each of the brake heads for said specialized braking system, said center lug receptacle substantially corresponding to the receptacle in a standard brake head, transferring a pair of the bars from the location of the toe of a standard brake head for cast metal shoes to outward positions for the composition shoes and affixing said tie bars at the outer extremities of each of the brake heads in position to interfere with the longitudinally extending toe guides on a standard cast metal shoe and prevent mounting of a cast metal shoe on the brake head.

2. In the manufacture of components for a specialized railroad braking system comprising a plurality of composition-type brake shoes that can cause excessive wear and damage when incorporated in a standard system constructed for utilization of standard cast metal brake shoes, in which specialized braking system cast metal shoes provide inadequate braking, the method of fabricating component parts for said specialized system to prevent substitution of standard cast metal shoes therein and to prevent incorporation of said composition-type shoes in a standard system comprising: affixing a center mounting lug to each of the composition-type shoes intended for use in said specialized braking system, said center mounting lug substantially corresponding to the center lug on a standard cast metal shoe, forming an upwardly extending toe guide near each end of each of the composition-type shoes, affording a pair of brake head tie bar receptacles each extending above the back of the shoe and in parallel relation to said toe guide at the corresponding end of the shoe and between an end of the shoe and a toe guide respectively, said toe guides being positioned for interfering engagement with the tie bars of a standard brake head for a cast metal shoe, whereby the composition-type shoes cannot be mounted on a standard brake head, forming a center lug receptacle in each of the brake heads for said specialized braking system, said center lug receptacle substantially corresponding to the receptacle in a standard brake head, transferring a pair of tie bars from the location of the toe of a standard brake head for cast metal shoes to outward positions for the composition shoes and affixing said tie bars at the outer extremities of each of the brake heads in position to interfere with the longitudinally extending toe guides on a standard cast metal shoe and prevent mounting of a cast metal shoe on the brake head.

3. The method of claim 2 wherein said toe guides are formed by bending upwardly a portion of a metal support on the back of the shoe.

References Cited by the Examiner
UNITED STATES PATENTS

| | | | |
|---|---|---|---|
| 2,900,711 | 8/1959 | Wilson | 29—407 |
| 2,902,752 | 9/1959 | Keating et al. | 29—407 |
| 2,974,759 | 3/1961 | Tack et al. | 188—243 |
| 3,088,557 | 5/1963 | Cabble et al. | 188—243 |

WHITMORE A. WILTZ, *Primary Examiner.*